United States Patent
Boydston et al.

(10) Patent No.: US 10,066,119 B2
(45) Date of Patent: *Sep. 4, 2018

(54) METHOD FOR SOLID FREEFORM FABRICATION

(71) Applicants: Ricoh Company, LTD., Tokyo (JP); University of Washington, Seattle, WA (US)

(72) Inventors: Andrew J. Boydston, Seattle, WA (US); Mark A. Ganter, Edmonds, WA (US); Duane Storti, Seattle, WA (US); Adam Edward Goetz, Seattle, WA (US); Mete Yurtoglu, Seattle, WA (US); Michael Byrnes Larsen, Seattle, WA (US); Gregory Isaac Peterson, Tacoma, WA (US); Di Zhang, Seattle, WA (US)

(73) Assignees: Ricoh Co., Ltd., Tokyo (JP); University of Washington, Seattle, WA (US)

( * ) Notice: Subject to any disclaimer, the term of this patent is extended or adjusted under 35 U.S.C. 154(b) by 231 days.

This patent is subject to a terminal disclaimer.

(21) Appl. No.: 14/991,884

(22) Filed: Jan. 8, 2016

(65) Prior Publication Data

US 2016/0257843 A1   Sep. 8, 2016

Related U.S. Application Data

(63) Continuation-in-part of application No. 14/637,062, filed on Mar. 3, 2015, and a continuation-in-part of application No. 14/637,070, filed on Mar. 3, 2015, now Pat. No. 9,808,993.

(51) Int. Cl.
| | | |
|---|---|---|
| *B29C 71/02* | (2006.01) |
| *B29C 71/04* | (2006.01) |
| *C09D 161/16* | (2006.01) |
| *B29C 64/165* | (2017.01) |
| *B29C 67/00* | (2017.01) |
| *C08G 65/48* | (2006.01) |
| *C08G 67/02* | (2006.01) |
| *C08G 8/28* | (2006.01) |
| *C08J 3/24* | (2006.01) |
| *C08J 3/28* | (2006.01) |
| *C08G 59/02* | (2006.01) |
| *C08G 59/68* | (2006.01) |
| *C09D 163/00* | (2006.01) |
| *C08G 65/40* | (2006.01) |
| *B33Y 10/00* | (2015.01) |
| *B33Y 30/00* | (2015.01) |
| *B33Y 70/00* | (2015.01) |
| *B29K 71/00* | (2006.01) |
| *B29K 105/24* | (2006.01) |
| *B29K 105/00* | (2006.01) |

(52) U.S. Cl.
CPC .......... *C09D 161/16* (2013.01); *B29C 64/165* (2017.08); *B29C 67/0081* (2013.01); *C08G 8/28* (2013.01); *C08G 59/027* (2013.01); *C08G 59/687* (2013.01); *C08G 65/4012* (2013.01); *C08G 65/48* (2013.01); *C08G 67/02* (2013.01); *C08J 3/24* (2013.01); *C08J 3/28* (2013.01); *C09D 163/00* (2013.01); *B29K 2071/00* (2013.01); *B29K 2105/24* (2013.01); *B29K 2105/251* (2013.01); *B33Y 10/00* (2014.12); *B33Y 30/00* (2014.12); *B33Y 70/00* (2014.12); *C08G 2650/40* (2013.01); *C08J 2361/16* (2013.01)

(58) Field of Classification Search
CPC ....... B29C 64/165; B29C 71/02; B29C 71/04; B29K 2071/00; B29K 2105/251; B33Y 10/00; B33Y 30/00; C08G 8/02; C08G 2650/36; C08G 2650/40; C08J 3/28; C08J 2361/16
USPC ................ 264/113, 236, 460, 461, 462, 463
See application file for complete search history.

(56) References Cited

U.S. PATENT DOCUMENTS

| | | | |
|---|---|---|---|
| 3,179,614 | A | 4/1965 | Edwards |
| 3,734,888 | A | 5/1973 | Darms |
| 5,998,092 | A | 12/1999 | McCulloch et al. |
| 7,700,020 | B2 | 4/2010 | Nielsen et al. |
| 7,767,132 | B2 | 8/2010 | Patel et al. |
| 2004/0036200 | A1 | 2/2004 | Patel et al. |
| 2004/0126694 | A1 | 7/2004 | Devoe et al. |
| 2005/0003189 | A1 | 1/2005 | Bredt et al. |
| 2007/0298182 | A1 | 12/2007 | Perret et al. |
| 2008/0241404 | A1 | 10/2008 | Allaman et al. |
| 2011/0040045 | A1 | 2/2011 | Colquhoun et al. |
| 2012/0231232 | A1 | 9/2012 | Xu et al. |
| 2016/0075840 | A1 | 3/2016 | Colquhoun et al. |
| 2016/0257783 | A1 | 9/2016 | Boydston |
| 2017/0260328 | A1 | 9/2017 | Boydston et al. |
| 2017/0326790 | A1 | 11/2017 | Lee et al. |

FOREIGN PATENT DOCUMENTS

| | | |
|---|---|---|
| DE | 10158233 | 3/2003 |
| DE | 10158233 A1 | 3/2003 |

(Continued)

OTHER PUBLICATIONS

Notice of Allowance for U.S. Appl. No. 14/991,876 dated Mar. 6, 2017, 12 pages.

(Continued)

*Primary Examiner* — Leo B Tentoni
(74) *Attorney, Agent, or Firm* — Patent Law Works LLP

(57) ABSTRACT

The present invention provides methods, processes, and systems for the manufacture of three-dimensional articles made of polymers using 3D printing. A layer of prepolymer is deposited on a build plate to form a powder bed. The deposited powder bed is heated to about 50° C. to about 170° C. Then, a solution of activating agent is printed on the powder bed in a predetermined pattern, and a stimulus is applied converting the prepolymer to the final polymer. After a predetermined period of time, sequential layers are printed to provide the three-dimensional article. The three-dimensional object can be cured to produce the three-dimensional article composed of the final polymers.

8 Claims, 2 Drawing Sheets

(56) References Cited

FOREIGN PATENT DOCUMENTS

| | | |
|---|---|---|
| DE | 10 2006 040305 | 3/2007 |
| EP | 2 067 606 | 6/2009 |
| JP | 2004522622 A | 7/2004 |
| JP | 2009508723 A | 3/2009 |
| JP | 2010528157 A | 8/2010 |
| WO | WO2008038541 A1 | 3/2008 |
| WO | WO2014077848 | 5/2014 |

OTHER PUBLICATIONS

Non-Final Office Action for U.S. Appl. No. 14/637,062 dated May 2, 2017, 13 pages.

JP Office Action for JP Application No. 2016-040127 dated May 10, 2017, 9 pages.

JP Office Action for JP Application No. 2016-040125 dated Jun. 26, 2017, 6 pages.

Notice of Allowance for U.S. Appl. No. 14/637,070, dated Jul. 17, 2017, 7 pages.

EP Partial Search Report for EP Application No. EP 16 15 7936 dated Jul. 12, 2016, 6 pages.

EP Extended Search Report for EP Application No. EP 16 15 7935 dated Jul. 12, 2016, 7 pages.

Francis et al., "Diglycidyl Ether of Bisphenol-A Epoxy Resin-Polyether Sulfone/Polyether Sulfone Ether Ketone Blends: Phase Morphology, Fracture Toughness and Thermo-Mechanical Properties", dated Aug. 17, 2006, 11 pages, Colloid and Polymer Science; Kolloid-Zeitschrift Und Zeitschrift Fur Polymere, Springer, Berlin, DE, vol. 285, No. 1.

Zhong et al., "Preparation and Properties of UV Irradiation-Induced Crosslinked Sulfonated Poly (ether ether ketone) Proton Exchange Membranes", dated Jan. 20, 2009, 8 pages, Journal of Membrane Science, Elsevier BV, NL, vol. 326, No. 2.

Extended European Search for EP Application No. EP 16 15 7936 dated Oct. 19, 2016, 12 pages.

Office Action from U.S. Appl. No. 14/637,062, dated Jan. 10, 2018, 25 pages.

METHOD FOR SOLID FREEFORM FABRICATION

CROSS REFERENCE TO RELATED APPLICATIONS

The present application claims priority from and is a continuation-in-part of U.S. patent application Ser. No. 14/637,062, which was filed on Mar. 3, 2015, and U.S. patent application Ser. No. 14/637,070, which was filed on Mar. 3, 2015 and which issued as U.S. Pat. No. 9,808,993, the disclosure of which are herein incorporated by reference in their entirety.

FIELD OF INVENTION

The present invention relates to methods and apparatus for creating three-dimensional articles by printing.

BACKGROUND

Three-dimensional (3D) printing refers to processes that create 3D objects based upon digital 3D object models and a materials dispenser. In 3D printing, a dispenser moves in at least 2-dimensions and dispenses material according to a determined print pattern. To build a 3D object, a platform that holds the object being printed is adjusted such that the dispenser is able to apply many layers of material, and printing many layers of material, one layer at a time, may print a 3D object.

A conventionally known 3D printing process is the UV ink-jet process. It is a three-stage process of applying a material, printing a UV-curable liquid, and finally hardened using a UV source. These steps are repeated layer-by-layer. In conventional 3D printing, disclosed in U.S. Pat. Nos. 6,375,874 and 6,416,850, generally an inkjet type print head delivers a liquid or a colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed.

The oldest and the best-known laser-based 3D printing process is stereolithography (SLA). In this process, a liquid composition of a radiation-curable polymer is hardened layer-by-layer by using a laser. A similar process is Selective Laser Sintering (SLS) in which a thermoplastic or a sinterable metal is sintered selectively layer-by-layer by a laser to form the 3D object.

U.S. Pat. No. 5,121,329 describes the fused deposition modeling (FDM) process for the production of three-dimensional objects using an extrusion-based, digital manufacturing system. There are also other known processes that are substantially analogous with slight differences, for example fused filament fabrication (FFF), melt extrusion manufacturing (MEM) or selective deposition modeling (SDM).

In the FDM method, two different polymer filaments are melted in a nozzle and are printed selectively. One of the materials involves a support material, which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer.

SUMMARY

The present invention provides methods, processes, and systems for manufacture of three-dimensional articles composed of polymers using 3D printing.

Disclosed are methods for cross-linking a polymer. The methods comprise exposing a solution of a polyketone polymer to a stimulus, wherein the polyketone polymer comprises one or more alkene groups or one or more epoxide groups In one aspect, disclosed are methods for manufacturing a three-dimensional article, the method comprising depositing a powder of prepolymer on a build plate to form a powder bed wherein the prepolymer comprises polyketone having one or more alkene groups or one or more epoxide groups, printing a solvent at selected locations on the powder bed, exposing the printed solution to a stimulus to form a polymer layer of the three-dimensional article, and, repeating the steps to manufacture remainder of the three-dimensional article.

In another aspect, a system for printing a three-dimensional article is provided. The system comprising a depositing mechanism to depose a powder of prepolymer on a build plate, a printing mechanism to print a solution of an activating agent at selected locations to form a polymer layer of the three-dimensional article, and a printing controller to repeat the printing mechanism to print the solution of the activating agent on the polymer layer exposed to a stimulus at a predetermined condition.

These and other aspects of the present invention will become evident upon reference to the following detailed description.

BRIEF DESCRIPTION OF DRAWINGS

In FIG. 2A, the roller 5, deposits prepolymer as a powder from a powder bed reservoir 2 to the powder bed 1. The build plate 3 can move in an up and down direction as needed. The head 4 prints a solution of an activating agent on the powder bed 1. FIG. 2B shows a single layer being patterned. In FIG. 2C, the roller 5, deposits prepolymer powder from a powder bed reservoir 2 to the powder bed 1. FIG. 2D shows that the prepolymer powder has formed a new powder bed layer, and the process can be repeated to print a three-dimensional article layer by layer.

DETAILED DESCRIPTION

I. Definitions

Figure 1:
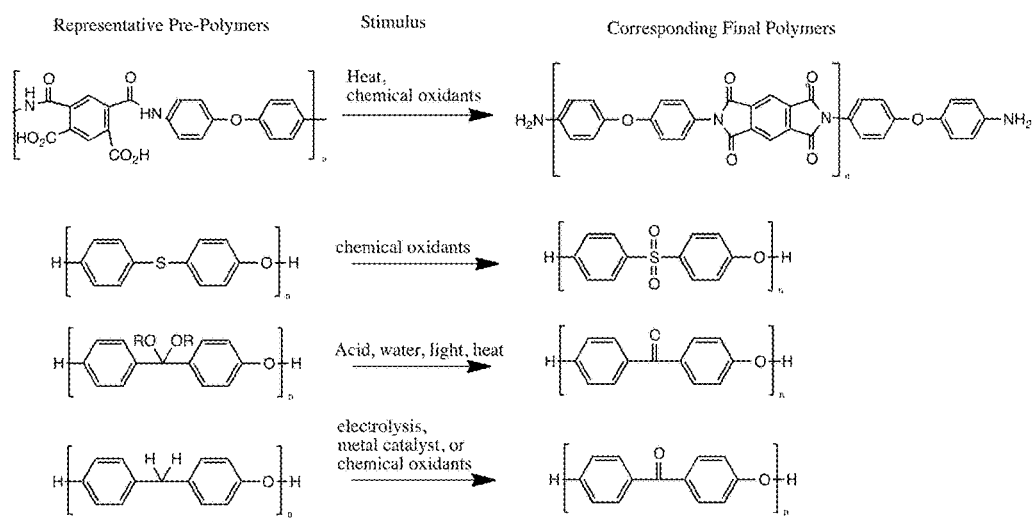
FIG. 1 illustrates representative prepolymers and their corresponding final polymers that can be used to manufacture 3D articles.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise.

The term "alkyl" means the monovalent branched or unbranched saturated hydrocarbon radical, consisting of carbon and hydrogen atoms, having from one to twenty carbon atoms inclusive, unless otherwise indicated. Examples of alkyl radicals include, but are not limited to, methyl, ethyl, propyl, isopropyl, butyl, isobutyl, sec-butyl, tert-butyl, pentyl, n-hexyl, octyl, dodecyl, and the like.

The term "alkylene" as used herein means the divalent linear or branched saturated hydrocarbon radical, consisting of carbon and hydrogen atoms, having from one to twenty carbon atoms inclusive, unless otherwise indicated. Examples of alkylene radicals include, but are not limited to, methylene, ethylene, trimethylene, propylene, tetramethylene, pentamethylene, ethylethylene, and the like.

The term "alkenylene" means the divalent linear or branched unsaturated hydrocarbon radical, containing at least one double bond and having from two to twenty carbon atoms inclusive, unless otherwise indicated. The alkenylene radical includes the cis or trans ((E) or (Z)) isomeric groups or mixtures thereof generated by the asymmetric carbons. Examples of alkenylene radicals include, but are not limited to ethenylene, 2-propenylene, 1-propenylene, 2-butenyl, 2-pentenylene, and the like.

The term "aryl" means the monovalent monocyclic aromatic hydrocarbon radical consisting of one or more fused rings in which at least one ring is aromatic in nature, which can optionally be substituted with hydroxy, cyano, lower alkyl, lower alkoxy, thioalkyl, halogen, haloalkyl, hydroxyalkyl, nitro, alkoxycarbonyl, amino, alkylamino, dialkylamino, aminocarbonyl, carbonylamino, aminosulfonyl, sulfonyl amino, and/or trifluoromethyl, unless otherwise indicated. Examples of aryl radicals include, but are not limited to, phenyl, naphthyl, biphenyl, indanyl, anthraquinolyl, and the like.

As used herein, a "build plate" refers to a solid surface made from material such as glass, metal, ceramic, plastic, polymer, and the like.

The term "halogen" as used herein refers to fluoro, bromo, chloro, iodo, or combinations thereof.

The term "optional" or "optionally" means that the subsequently described event or circumstance may or may not occur, and that the description includes instances where the event or circumstance occurs and instances where it does not.

All publications, patents and patent applications cited herein, whether supra or infra, are hereby incorporated by reference in their entirety.

II. Overview

Disclosed are methods for manufacturing articles made of polymers using three-dimensional printing. The disclosed methods have the advantage of being able to rapidly print three-dimensional articles that have better mechanical properties, better thermal properties, and the like. The disclosed methods are more flexible than other art methods in that they allow the three-dimensional article to be built around another, such as a conducting wire to make a circuit. In addition, the manufactured articles have molecular structural features and physical properties that match those of the final polymers, such as Kapton® polymers, polyketone polymers, and polyethersulfone polymers.

In one application, a layer of prepolymer powder is deposited on a build plate as a powder bed, and then a solution of activating agent is selectively printed to appropriate regions of the prepolymer powder bed in accordance with the three-dimensional article being formed. A stimulus is applied that polymerizes the prepolymer to form the final polymer. Subsequent sequential applications of prepolymer powder, printing of activating agent and exposing to a stimulus complete the formation of the desired 3D article. The three-dimensional article is thus manufactured layer-by-layer. Once suitable number of layers have been deposited, the article is cured to provide the three-dimensional article made of the final polymer. The curing can be performed on the build plate or by removing the article from the build plate and then curing it.

III. Polymers and Prepolymers

The three-dimensional form can be made from one or more materials. In certain embodiments, the three-dimensional form can comprise polymers. Any type of polymer can be used to form the three-dimensional form, and the polymer can be selected such that the three-dimensional form has the desired properties. Thus, the polymer can be polyimides, polyketones, reduced form of polyketones, polyethersulfones, and the like. Representative prepolymers and their corresponding final polymers are shown in FIG. 1.

Polyimide Polymers and its Prepolymers

In one aspect, the three-dimensional article made from a final polymer that is a polyimide polymer. The polyimide polymer can be selected based on its properties, such as high adhesion properties, high strength, mechanical properties, heat resistance, chemical resistance, electrical insulation, and the like. The polyimide polymers can be prepared by imidization of the poly(amic acid), using methods known in the art. Thus, for example, the poly(amic acid) can be exposed to a stimulus that is heat or a chemical imidization reactant.

The poly(amic acid) is a condensation polymer prepared by reaction of one or more dianhydride and one or more diamine, as shown in the equation below.

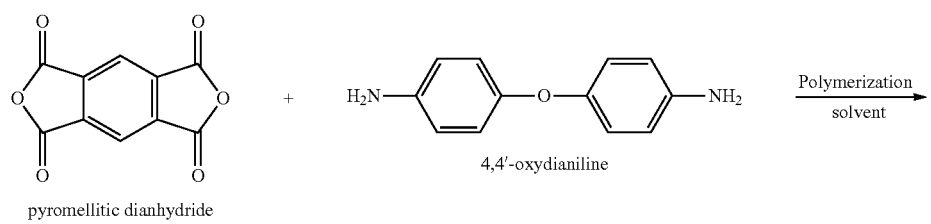

-continued

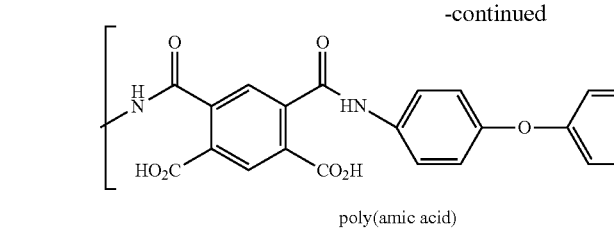

poly(amic acid)

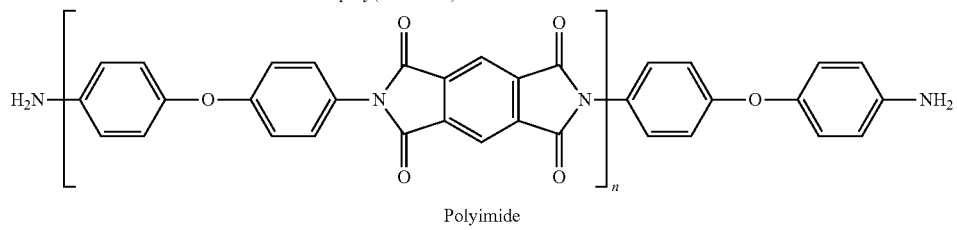

Polyimide

Preferably, the dianhydride is an aromatic dianhydride and the diamine is an aromatic diamine. For example, the poly(amic acid) can be prepared by mixing a diamine (5-95 mole % equivalent) with a dianhydride (5-95 mole % equivalent) and allowing the reaction to form the poly(amic acid). The poly(amic acid) can be cured using thermal or chemical imidization to provide the polyimide polymer.

Suitable aromatic dianhydrides include but are not limited to pyromellitic dianhydride (PMDA), biphenyltetracarboxylic dianhydride (BPDA), 3,3',4,4'-benzophenone-tetracarboxylic dianhydride (BTDA), phthalic anhydride (PA) 1,4,5,8-naphthalenetetracarboxylic dianhydride, 2,3,6,7-naphthalenetetracarboxylic dianhydride, 1,4,5,8-naphthalenetetracarboxylic acid, 2,3,6,7-naphthalenetetracarboxylic acid and mixtures thereof. Suitable diamines include but are not limited to oxydianiline (ODA), 1,3-bis(4-aminophenoxy)benzene (RODA), p-phenylenediamine (PPD), m-phenylenediamine (MPD) and mixtures thereof. Preferred dianhydrides is PMDA and preferred diamine is ODA.

According to a further embodiment, the dianhydride monomer can be selected from a group consisting of 1,2,4,5-benzene tetracarboxylic dianhydride, 3,3',4,4'-biphenyl tetracarboxylic dianhydride, 4,4'-oxydiphthalic anhydride, benzophenonetetracarboxylic dianhydride, 3,3',4,4'-diphenyl sulfonetetracarboxylic dianhydride, 1,2,5,6-naphthalene tetracarboxylic dianhydride, naphthalenetetracarboxylic dianhydride, bis(3,4-dicarboxyphenyl)dimethylsilane dianhydride, 1,3-bis(4'-phthalic anhydride)-tetramethyldisiloxane and a combination thereof.

According to another embodiment, the diamine monomer can be selected from a group consisting of 1,4 diamino benzene, 1,3 diamino benzene, 4,4'-oxydianiline, 3,4'-oxydianiline, 4,4'-methylene dianiline, N,N'-diphenylethylenediamine, diaminobenzophenone, diamino diphenyl sulfone, 1,5-naphenylene diamine, 4,4'-diamino diphenyl sulfide, 1,3-bis(3-aminophenoxy)benzene, 1,4-bis(4-aminophenoxy)benzene, 1,3-bis(4-aminophenoxy)benzene, 2,2-bis[4-(4-amino phenoxy)phenoxy]propane, 4,4'-bis-(4-aminophenoxy)biphenyl, 4,4'-bis-(3-aminophenoxy)biphenyl, 1,3-bis(3-aminopropyl)-1,1,3,3-tetramethyldisiloxane, 1,3-bis(3-aminopropyl)-1,1,3,3-tetraphenyldisiloxane, 1,3-bis(aminopropyl)-dimethyldiphenyldisiloxane and a combination thereof.

A poly(amic acid), as a precursor to a polyimide, can be obtained by polymerizing an aromatic diamine compound and an aromatic dianhydride compound, preferably in substantially equimolar amounts, in an organic polar solvent that is generally a high-boiling solvent. In one embodiment, the molar ratio of the dianhydride monomer to the diamine monomer is from 0.9:1 to 1.1:1. In another embodiment, the mole number of the dianhydride monomer about equal to less than the mole number of the diamine monomer. In a specific embodiment, the molar ratio of the dianhydride monomer to the diamine monomer is about 0.98:1 or 1.0:1.0. The temperature for the reaction is generally not higher than about 200° C., and may be in the range of about 0° C. to 100° C., preferably in the range of about 10° C. to about 50° C., more preferably about room temperature. The temperature can be about 0° C., 5° C., 10° C., 15° C., 20° C., 25° C., 30° C., and the like. The time for the polymerization reaction generally is in the range of about 0.2 to 60 hours. Exemplary poly(amic acid)s made by this process are shown below:

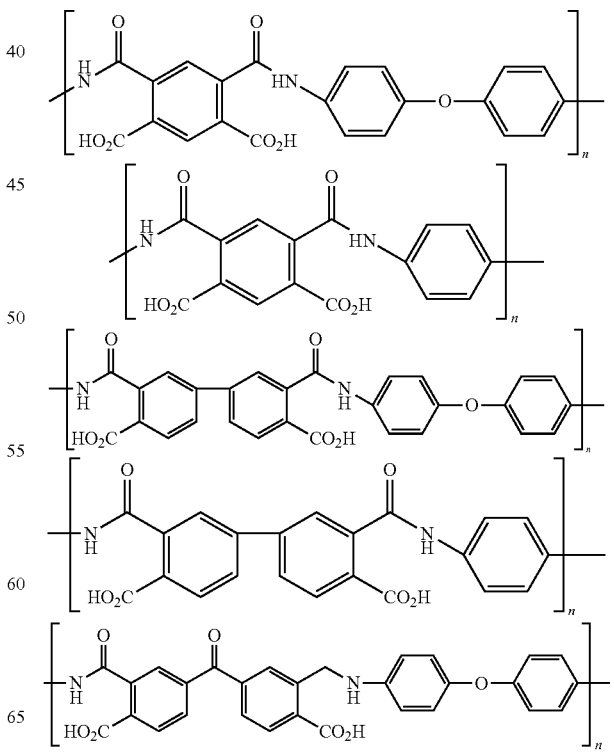

-continued

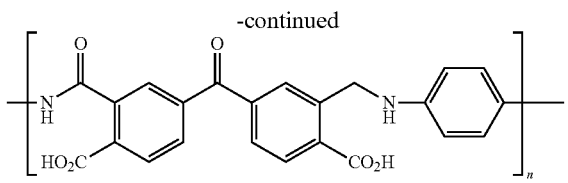

The poly(amic acid) has a molecular weight such that the three-dimensional article has high strength and is not brittle. The poly(amic acid) preferably have an average molecular weight from 1,000 to 400,000, more preferably from 10,000 to 350,000, still more preferably from 15,000 to 100,000. Thus, the poly(amic acid) can have an average molecular weight of about 5,000, 7,000, 10,000, 15,000, 17,000, 19,000, 20,000, 22,000, 23,000, 24,000, 25,000, and the like.

In another aspect, the poly(amic acid) has an average molecular weight (in Daltons) where the molecular weight distribution is in a range of about 500 to about 20,000, preferably a range of about 1,000 to about 10,000, or more preferably, a range of about 3,000 to about 7,000. Thus, the poly(amic acid) can have a molecular weight distribution between about 3,000 to about 5,000, about 10,000 to about 13,000, about 15,000 to about 18,000, about 23,000 to about 27,000, and the like.

The poly(amic acid) powder can be obtained as a solid by removal of the solvent. The solid poly(amic acid) can be further treated to provide a powder having the desired particle size distribution or particle shape. The particle size of the solid poly(amic acid) can be reduced by utilizing mechanical devices, such as, for example, mortar and pestle, milling, application of ultrasonic energy, by spray drying, or by shearing the particles in a liquid flowing at high velocity in a restricted passage. For example, the solid poly(amic acid) can be ground using a mortar, it can be milled, it can micronized, or it can be nanonized to provide poly(amic acid) powder with the desired average particle size. Thus, the solid poly(amic acid) can be milled to provide poly(amic acid) powder having an average particle size of about 5 microns to about 250 microns, or about 10 microns to about 100 microns, and the like. Thus, the poly(amic acid) powder can have an average particle size of about 5 microns to about 25 microns, about 20 microns to about 60 microns, about 10 microns to about 20 microns, about 20 microns to about 30 microns, about 40 microns to about 50 microns, or about 25 microns to about 50 microns.

Poly(amic acid) powder having an average particle size of between 10 nm and 10 microns are useful in the compositions described herein. In some aspects, the particles can be nanoparticles having diameters of about 1 nm to about 1000 nm, from about 10 nm to about 200 nm, and from about 50 nm to about 150 nm. In another aspect, the particles can have a size range from about 500 nm to about 600 nm.

The particles can have any shape but are generally spherical in shape. Suitable particles can be spheres, spheroids, flat, plate-shaped, tubes, cubes, cuboids, ovals, ellipses, cylinders, cones, or pyramids. The particles can also have random or ill-defined shapes or can be amorphous.

Preferably, the method used to form the powder produces a monodisperse distribution of particles. However, methods producing polydisperse particle size distributions can be used. If the method does not produce particles having a monodisperse size distribution, the particles can be separated following particle formation to produce a plurality of particles having the desired size range and distribution. Alternatively and equivalently, commercially available poly (amic acid) can be used in the disclosed methods.

Polyketone Polymers and its Prepolymers

In one aspect, the three-dimensional form can be made from a final polymer that is a polyketone, such as polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK). If the polyketone polymer is PEEK, it typically can be obtained by reacting a substantially equimolar mixture of at least one aromatic dihydroxy compound and at least one dihalobenzoid compound or at least one halophenol compound, as shown below:

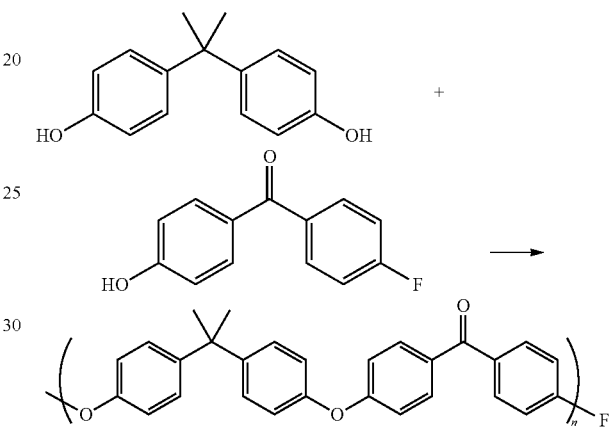

Non-limiting examples of aromatic dihydroxy compounds useful in such a process are hydroquinone, 4,4'-dihydroxybiphenyl and 4,4'-dihydroxybenzophenone. Exemplary suitable aromatic dihydroxy compounds include bis(hydroxyaryl)alkanes such as bis(4-hydroxyphenyl) methane, bis(2-methyl-4-hydroxyphenyl)methane, bis(3-methyl-4-hydroxyphenyl)methane, 1,1-bis(4'-hydroxyphenyl)ethane, 1,2-bis(4'-hydroxyphenyl)ethane, bis(4-hydroxyphenyl)phenylmethane, bis(4-hydroxyphenyl) diphenylmethane, bis(4-hydroxyphenyl)-1-naphthylmethane, 1,1-bis(4'-hydroxyphenyl)-1-phenylethane, 1,3-bis(4'-hydroxyphenyl)-1,1-dimethylpropane, 2,2-bis(4'-hydroxyphenyl)propane ["Bisphenol A"], 2-(4'-hydroxyphenyl)-2-(3"-hydroxyphenyl)propane, 1,1-bis(4'-hydroxyphenyl)-2-methylpropane, 2,2-bis(4'-hydroxyphenyl)butane, 1,1-bis(4'-hydroxyphenyl)-3-methylbutane, 2,2-bis(4'-hydroxyphenyl)pentane, 2,2-bis(4'-hydroxyphenyl)-4-methylpentane, 2,2-bis(4'-hydroxyphenyl)hexane, 4,4-bis(4'-hydroxyphenyl)heptane, 2,2-bis(4'-hydroxyphenyl)octane, 2,2-bis(4'-hydroxyphenyl)nonane, bis(3,5-dimethyl-4-hydroxyphenyl)methane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl) propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, 2,2-bis(3'-chloro-4'-hydroxyphenyl)propane, 2,2-bis(3',5'-dichloro-4'- hydroxyphenyl)propane, 2,2-bis(3'-bromo-4'-hydroxyphenyl)propane, 2,2-bis(3',5'-dibromo-4'-hydroxyphenyl)propane, 2,2-bis(2',6'-dibromo-3',5'-dimetyl-4'-hydroxyphenyl)propane, bis(4-hydroxyphenyl) cyanomethane, 3,3-bis(4'-hydroxyphenyl)-1-cyanobutane, 2,2-bis(4'-hydroxyphenyl)hexafluoropropane and the like.

Non-limiting examples of dihalobenzoid compounds useful in such a process are 4,4'-difluorobenzophenone, 4,4'-dichlorobenzophenone, 4-chloro-4'-fluorobenzophenone, and the like; non limitative examples of halophenols compounds useful in such a process are 4-(4-chlorobenzoyl) phenol and (4-fluorobenzoyl)phenol. Accordingly, PEEK polymers can be produced by the nucleophilic process as described in, for example, U.S. Pat. No. 4,176,222, or by electrophilically polymerizing the starting materials as described in U.S. Pat. No. 6,566,484. Other poly(aryl ether ketone)s can be produced by starting from other monomers such as those described in U.S. Patent Application No. 2003/0130476. If the polyketone polymer is PAEK, PEK, PEKK, PEEEK, PEEKK, PEKEKK, or PEKKK, they can be synthesized using known methods. Alternatively and equivalently, a commercially available PEEK, PAEK, PEK, PEKK, PEEEK, PEEKK, PEKEKK, or PEKKK polymer can be used.

The aromatic dihydroxy compounds can comprise one or more alkene groups, one or more thiol groups, or one or more epoxide groups that can participate in photo-initiate thiol-ene polymerization. Examplary structures are shown below:

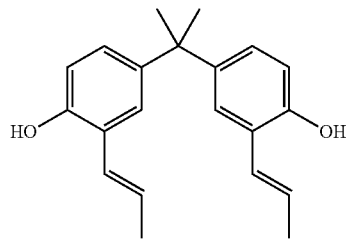

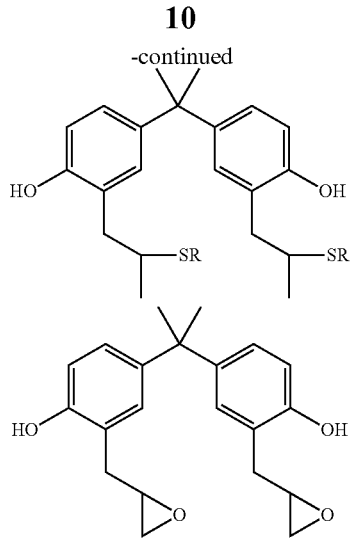

It should be appreciated that all compounds having one or more alkene functional groups are suitable in conjunction with the teachings presented herein. However, it is generally preferred that the polyalkene or alkene compound has at least two alkene groups. The alkene groups may be provided by allyls, allyl ethers, vinyl ethers, acrylates. For example, the olefin moiety can be selected from any suitable ethylenically unsaturated group such as allyls, allyl ethers, vinyl, vinyl ether, acetyl, acrylate, methacrylate, maleimide, norbornene or other monomers containing a carbon-carbon double bond, or combinations thereof. For example, the monomer can be 2,2'-diallylbisphenol-A, O,O'-diallylbisphenol A, 3,3'-diallylbisphenol A, and bisphenol A bisallyl carbonate. Other allylic monomers include diallyl phthalate, diethylene glycol bisallyl carbonate, and diallyl diphenate.

A polyketone polymer can be obtained by reacting a mixture of at least one monomer having an alkene group, at least one aromatic dihydroxy compound and at least one dihalobenzoid compound or at least one halophenol compound, as shown below:

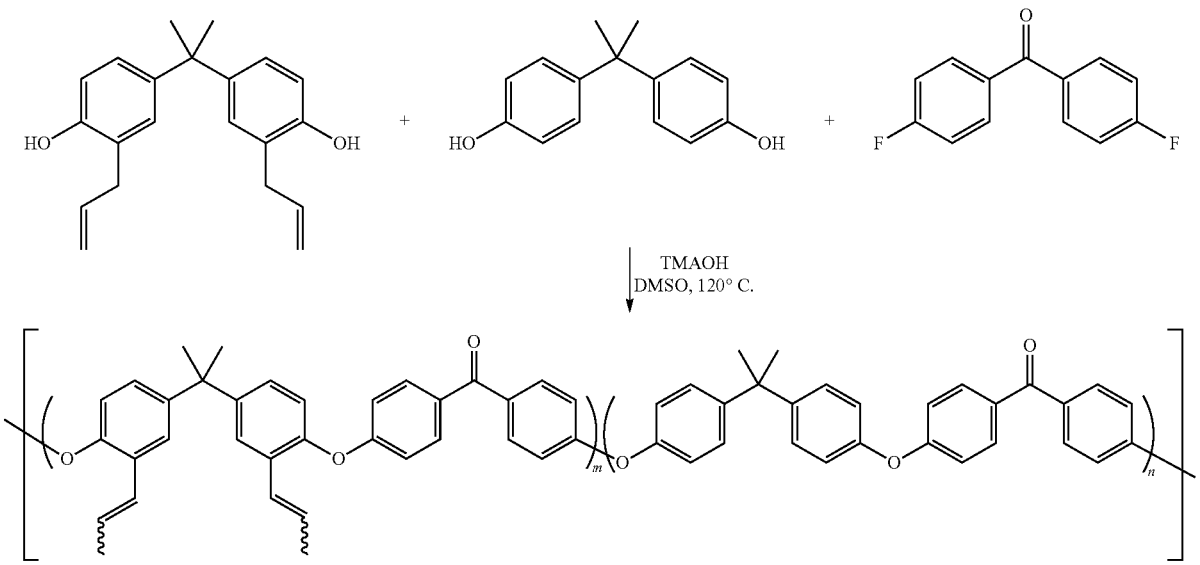

The three monomers can be arranged in alternating sequence or in a random order as blocks of monomers, and can be in any ratio. Preferably, the ketone monomer is about 50% of the reaction mixture. Thus, the reaction mixture can contain a substantially equimolar mixture of the dihydroxy compounds and the dihalobenzoid compound. Thus, the ratio of the monomer having the alkene group to the aromatic dihydroxy monomer can be 100:0, 95:5, 90:10, 75:25, 50:50, 25:75, 10:90, 5:95, 0:100, or any other ratio in between.

The prepolymer of the polyketone polymer can be a ketal, where one or more of the carbonyl group (>C=O) can be converted to a diether (>C(OR)$_2$), where each R can be independently selected to be alkyl, alkylene, alkenylene, aryl, or combination thereof. The ketal can be produced by reaction of the carbonyl group with, for example, an alcohol, such as a primary alcohol, a secondary alcohol, a tertiary alcohol, or a combination thereof. The ketal can be acyclic, cyclic, or spiro cyclic ketal. The prepolymer of the polyketone polymer can also be a thioketal, a dithioketal, or a hemiketal. The ketal, hemiketal, thioketal or dithioketal can be obtained by reacting the dihalobenzoid compound with the alcohol or with a thiol, as shown below:

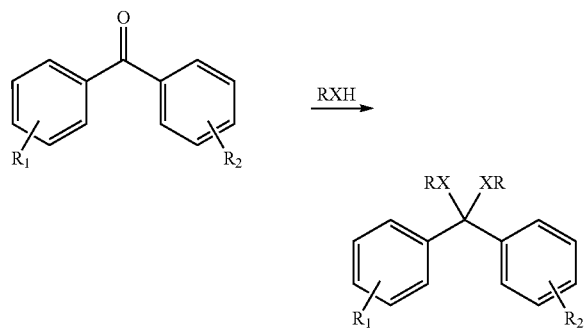

where X can be a hetero atom, such as oxygen or sulfur. Examples of suitable monofunctional alcohols include methanol, ethanol, various linear and branched isomers of propanol, butanol, pentanol, hexanol, octanol, nonanol, decanol, undecanol, dodecanol, tetradecanol, cetyl alcohol, and stearyl alcohol; cycloalkyl alcohols such as cyclohexanol, cyclooctanol, norbornyl alcohol, and the like; alkynyl alcohols such as ethynyl alcohol, 3-methylpent-1-yn-3-ol, tetradec-9-ynol, and the like; aryl and alkaryl alcohols such as phenol, benzyl alcohol, toluol, xylyl alcohol, 5-phenyl-pentanol, and the like; and alcohols having various functional groups, for example 1,1,1-trichloro-2-methyl-2-propanol, 5-fluoro-1-pentanol, 5-amino-1-pentanol, 5-benzyloxy-1-pentanol, 5-methoxy-1-pentanol, 3-nitro-2-pentanol, 4-methylthio-1-butanol, 6-hydroxyhexanoic acid, lactamide, and the like. In some embodiments, the ketal can by a cyclic ketal formed by the reaction of polyols with the carbonyl moieties. Examples of suitable polyols include 1,2-ethanediol (ethylene glycol), 1,2-propanediol (propylene glycol), 1,3-propanediol, 1,2,3-propanetriol (glycerol), diglycerol (a mixture of glycerol dimers coupled at primary and secondary hydroxyl moieties), 2,2-dimethyl-1,3-propanediol (neopentyl glycol), 3-mercaptopropane-1,2-diol (thioglycerol), dithiothreitol, 1,1,1-trimethylolpropane, 1,2-butanediol, 1,3-butanediol, pentaerythritol, cyclohexane-1,2-diol, 1,4-dioxane-2,3-diol, and the like.

The ketal, hemiketal, thioketal or dithioketal can then be used as the prepolymer starting material for performing the polymerization reaction wherein the final polymer is produced. Alternatively, the polymer can first be obtained, and at least one of the carbonyl groups can then be converted to a ketal, hemiketal, thioketal or dithioketal to provide the prepolymer.

When the prepolymer is a ketal, the carbonyl group of the ketone moiety can be readily regenerated by hydrolysis using water, acidic solution, heat, light, base catalysis, catalytic hydrogenation, or a combination thereof. For example, the prepolymer can be converted to the final polyketone polymer using a stimulus that is a Brønsted acid or a Lewis acid based reagent. Thus, for example, dilute solution of hydrochloric acid, hydrobromic acid, perchloric acid, acetic acid, sulfuric acid, arylsulfonic acids and hydrates thereof, such as p-toluenesulfonic acid monohydrate, phosphoric acid or orthophosphoric acid, polyphosphoric acid, sulfamic acid, and the like can be used as the stimulus. In other embodiments, the acid catalysts employed are aprotic, also referred to as Lewis Acids. Such Lewis acid catalysts can include, for example, titanium tetrachloride, aluminum trichloride, boron trifluoride, stannic chloride, and the like. In some embodiments, more than one type of acid catalyst is used; thus, blends of one or more of the acids mentioned above may be used in a mixture to catalyze the reactions.

The prepolymer can be converted to the final polyketone polymer by application of light as the stimulus. The light can be ultraviolet, infrared, visible, or combination thereof. The light sources are conventionally well known in the art, and include a low-pressure, a medium-pressure or a high-pressure mercury lamp, and a metal halide lamp, a xenon lamp, a cathode tube, a LED, and the like. In one embodiment, the application of light can be under neutral conditions, optionally in the presence of a catalyst, such as iodine, indium(III) trifluoromethane-sulfonate or tetrakis(3,5-trifluoromethyl-phenyl)borate, a Lewis acid catalyst, and the like.

The prepolymer of the polyketone polymer can be the reduced form of the polyketone, as shown in FIG. 1, where one or more of the carbonyl group (>C=O) has been converted to a CH$_2$ group. When the prepolymer is a reduced form of the polyketone, the carbonyl group of the ketone moiety can be readily regenerated by exposing the prepolymer to a stimulus, such as, electrolysis, metal catalyst, or a chemical oxidant, as is known in the art.

The prepolymer of the polyketones can be obtained as a solid by removal of the solvent. The solid prepolymer of the polyketones can be further treated to provide a powder having the desired particle size distribution or particle shape, as described in detail above.

Polyethersulfone Polymers and its Prepolymers

In another aspect, the three dimensional object can be made from a final polymer that is a polysulfone polymer. Polysulfones, as used herein, refers to a family of polymers which contain the subunit -aryl-SO$_2$-aryl-, more specifically -aryl-SO$_2$-aryl-O—, as shown below:

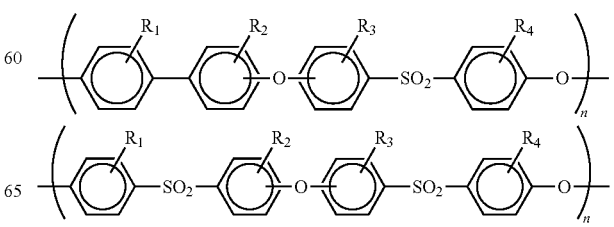

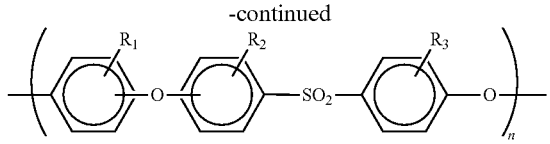

where $R_1$, $R_2$, $R_3$, $R_4$ are independently selected to be an alkyl, an alkylene, an aryl, or a halogen. Aromatic polyethersulfones can be prepared, for example, by the reaction of dialkali metal salts of diphenols with dihalodiarylsulfones in a solvent. The dialkali salts of diphenols may also be produced in situ or may be produced in a separate reaction. The diphenols can be any one as described above or known in the art. The polysufones includes a polymer of 4-[2-(4-hydroxyphenyl)propan2-yl]phenol and 4-(4-hydroxyphenyl)sulfonylphenol, commonly known as polysulfone, and a polymer of benzene-1,4-diol and 4-(4-hydroxyphenyl)sulfonylphenol commonly known as polyethersulfone. Polyethersulfone (PES) is also known as polyarylethersulfone (PAES) and/or polyphenylsulfone (PPSU). Another suitable polysulfone is a copolymer of 4-(4-hydroxyphenyl)phenol and 4-(4-hydroxyphenyl)sulfonylphenol, also known as polyphenylsulfone. Other exemplary polysulfones are described in U.S. Pat. No. 5,911,880.

Polyethersulfones can be produced by a variety of methods. For example, U.S. Pat. Nos. 4,108,837 and 4,175,175 describe the preparation of polyarylethers and in particular polyarylethersulfones. U.S. Pat. No. 6,228,970 describes the preparation polyarylethersulfones with improved polydispersity and lower amounts of oligomers. British patent GB 1,264,900 teaches a process for production of a polyethersulfone comprising structural units derived from 4,4'-biphenol, bisphenol-A (4,4'-isopropylidenediphenol), and 4,4'-dichlorodiphenylsulfone. Thus, the polysulfone polymers can be synthesized using known methods. Alternatively and equivalently, commercially available polysulfone polymers can be used.

The prepolymer of the polyethersulfone can be the corresponding polysulfide. The prepolymer comprising the polysulfide can be converted to the final polyethersulfone polymer by means of a stimulus, such as an oxidant. Thus, for example, the prepolymer comprising the polysulfides can be contacted with a stimulus that is an oxidant for a sufficient time to oxidize the sulfur atom in the prepolymer to a sulfone. The oxidant can be an organic peroxy acids, an organic peroxides, an inorganic peroxides, or mixtures thereof. Thus, the oxidant can be bromine or chlorine in the presence of water, ozone, osmium tetroxide, permanganates, hydrogen peroxide, alkyl hydroperoxides and percarboxylic acids as, for example, performic acid, peracetic acid or perbenzoic acids. Suitable oxidizers include organic peroxy acids such as carboxylic peracids, preferably carboxylic per acids having 2 or more carbon atoms, more preferably peracetic acid; organic peroxides such as t-butyl hydrogen peroxide; inorganic peroxides such as hydrogen peroxide, perborates, persulfates; and mixtures thereof such as carboxylic acid hydrogen peroxide mixtures.

One category of suitable organic peracids includes peracids of an organic aliphatic monocarboxylic acid having 1-5 carbon atoms, such as formic acid, acetic acid (ethanoic acid), propionic acid (propanoic acid), butyric acid (butanoic acid), iso-butyric acid (2-methyl-propanoic acid), valeric acid (pentanoic acid), 2-methyl-butanoic acid, iso-valeric acid (3-methyl-butanoic) and 2,2-dimethyl-propanoic acid. Organic aliphatic peracids having 2 or 3 carbon atoms, e.g., peracetic acid and peroxypropanoic acid, can also be used. Suitable organic peracids includes peracids of a dicarboxylic acid having 2-5 carbon atoms, such as oxalic acid (ethanedioic acid), malonic acid (propanedioic acid), succinic acid (butanedioic acid), maleic acid (cis-butenedioic acid) and glutaric acid (pentanedioic acid). Peracids having between 6-12 carbon atoms that can be used as oxidants include peracids of monocarboxylic aliphatic acids such as caproic acid (hexanoic acid), enanthic acid (heptanoic acid), caprylic acid (octanoic acid), pelargonic acid (nonanoic acid), capric acid (decanoic acid) and lauric acid (dodecanoic acid), as well as peracids of monocarboxylic and dicarboxylic aromatic acids such as benzoic acid, salicylic acid and phthalic acid (benzene-1,2-dicarboxylic acid). Other suitable oxidizers include peroxynitrous acid and its salts, peroxyphosphoric acids and their salts, peroxysulfuric acids and their salts, such as peroxymonosulfuric and peroxydisulfuric acids, and their salts, sodium periodate, potassium perchlorate, and the like. Other active inorganic oxygen compounds can include transition metal peroxides, and other such peroxygen compounds, and mixtures thereof. The amount of oxidizer is preferably sufficient for the conversion of a sulfur compound to a sulfone.

The polysulfide prepolymer can be obtained as a solid by removal of the solvent. The solid prepolymer of the polyketones can be further treated to provide a powder having the desired particle size distribution or particle shape, as described in detail above.

IV. Activating Agent

An activating agent is provided for forming the polymer of the three-dimensional article. The activating agent can be an acyl transfer reagent, such as, for example, an activated ester, an alkyl halide, an acyl halide, or an anhydride. Examples include acetic anhydride, propionic anhydride, benzoic anhydride, triflic anhydride, N,N-dimethyl-4-aminopyridine (DMAP), benzoyl chloride, 2-furoyl chloride, benzyl chloroformate, N-phenyl bis(trifluoromethane sulfonamide), methanesulfonyl chloride, diethyl chlorophosphate and the like. The activating agent can be a Lewis acid catalyst, such as for example boronic acid, aryl boronate esters, alkyl boronate esters, alkenyl boronate esters, alkynyl boronate esters, and the like.

In another aspect, the activating agent can be a base, such as an amine. The amine can be a primary amine, a secondary amine, a tertiary amine, an aromatic amine, an amino acid, and the like. The amine can be, for example, arginine, benzylamines, benzyldimethylamine, N,N'-bis(2-aminoethyl)-1,2-diaminoethane, bis(2-aminoethyl)amines, bis(2-fluoro-2,2-dinitroethyl)amine, 1,2-bis(dimethylamino)-ethane, butylamines, 2-butylamines, butylethylamines, cyclohexylamines, cyclopentylamines, di-2-butylamines, 1,4-diaminobenzene, 1,2-diaminoethane, 1,2-diaminopropane, 1,3-diaminopropane, dibutylamine, 3-dibutylaminopropylamine, diethylamine, 3-diethylaminopropylamine, diethylenetriamine, diisobutylamine, diisopropylamine, 3,3'-dimethoxy-4,4'-diaminobiphenyl, dimethylamine, 2-dimethylamino-ethylamine, N,N-dimethylaniline and derivatives thereof, 1,3-dimethylbutylamine, 2,6-dimethyl-piperidine and derivatives thereof, 2,2-dimethylpropylamine, 1,2-dimethylpropylamine, 1,1-dimethylpropylamine, N,N-dimethylpropylamine, dipropylamine, 5-ethyl-2-methylpyridine, ethylamine, ethyldimethylamine, ethylenediamine, 1-ethylpiperidine, 2-ethylpiperidine, urea, hexamethylenetetramine, histidine, N-2-hydroxyethyl-1,2-diaminoethane, 2-hydroxyethylamine, sodium methoxide, sodium ethoxide, sodium isopropoxide, N-2-hydroxyethyl-dimethylamine, imidazole, indole, isobutylamine, isopentylamine, isopropylamine, melamine, methylamine, N-methylbutyl amine, 4-methylmorpholine, 1-methylpiperidine, 2-methylpiperidine, 3-methylpiperidine, 4-methylpiperidine, 2-methylpyridine, N-methyl-pyrrolidine, morpholine and derivatives thereof, pentylamine, N-phenylhydroxylamine, piperazine and derivatives thereof, piperidine and derivatives thereof, propylamine, pyridine and derivatives thereof, quinoline and derivatives thereof, 1,2,3,6-tetrahydropyridine and derivatives thereof, 1,3,4,7-tetramethylisoindole, 1,2,4,5-tetrazine, 1,3,5-triazine, triethylamine, trimethylamine, 2,4,6-tris(dimethylaminomethyl)phenol, tris(hydroxymethyl)methylamine, vinylpyridines or mixtures of these compounds. In another aspect, the amine can be a tripodal amine, such as, for example triaminotriphenylamine, tris(2-pyridylmethyl)amine, tris(2-dimethylaminoethyl)amine, and the like.

The activating agent is preferably acetic anhydride, pyridine, triethylamine, N-methyl-pyrrolidine, or combinations thereof. In another aspect, the activating agent is acetic anhydride and an amine base in about 0.1:1 to about 10:1 molar ratio, preferably about 0.5:1 to about 2:1 molar ratio, more preferably about 0.9:1 to about 1.1:1 molar ratio. The acetic anhydride and an amine base can be in about 1:1 molar ratio, where the amine can be selected from the group consisting of pyridine, triethylamine, N-methyl-pyrrolidine, or combinations thereof.

The activating agent can be dissolved in an organic solvent, preferably a polar organic solvent, such as, for example, solvents having a nitrogen atom in the molecule such as N,N-dimethyl acetamide, N,N-diethylacetamide, N,N-dimethylformamide, N,N-diethylformamide, N-methyl-2-pyrrolidone, 2-pyrolydon, N-methyl-2-pyrolydon, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide, tetramethylene sulfone; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; and other solvents such as acetone, dimethylimidazoline, methanol, ethanol, ethylene glycol, dioxane, tetrahydrofuran, pyridine, and tetramethylurea. In addition, amido based solvents can be used, such as $R_3O-(CH_2)_nC(O)NR_1R_2$, where $R_1$, $R_2$, and $R_3$ can be independently selected to be H or lower alkyl, such as methy (Me), ethyl (Et), n-propyl (n-Pr), iso-propyl (i-Pr), n-buty (n-Bu), s-butyl (s-Bu), tert-butyl (t-Bu), and the like. These may be used in combination of two or more. In one aspect, the solvent can be N-methyl-2-pyrrolidone (NMP), N,N-dimethylformamide (DMF), N,N-dimethylacetamide (DMAc), or combinations thereof The activating agent can be dissolved in an organic solvent, such as NMP, DMF, DMAc, or any of the others described in detail above, to provide a 1% solution, a 5% solution, a 10% solution, a 15% solution, a 20% solution, a 25% solution, a 30% solution, a 35% solution, a 40% solution, a 45% solution, a 50% solution, and the like.

V. Cross-Linking

The 3-dimensional objects can be formed by a cross-linking process. Thus, the prepolymer solutions described above can undergo cross-linking to form an at least partially cross-linked polymerics. Cross-linking can be affected via the addition of chemicals, exposure to radiation, such as ultraviolet radiation, visible radiation, infrared radiation and/or electron beam radiation, or heat. Optionally, a photoinitiator can be included in the formulation. Photoinitiators may be any chemical compound that decomposes into free radicals when exposed to light, e.g., UV radiation having a wavelength in the range of about 350 nm to about 450 nm. The free radicals initiate polymerization to form cross-linked polymers. In one variation, the photoinitiator initiates ring opening polymerization. In another variation, the photoinitiator initiates cationic polymerization. In a further variation, the photoinitiator initiates polymerization by a thiol-ene reaction.

In a thiol-ene reaction, alkene moieties present in the polymer are transformed into thioethers by reaction with thiols, as illustrated by the reaction below:

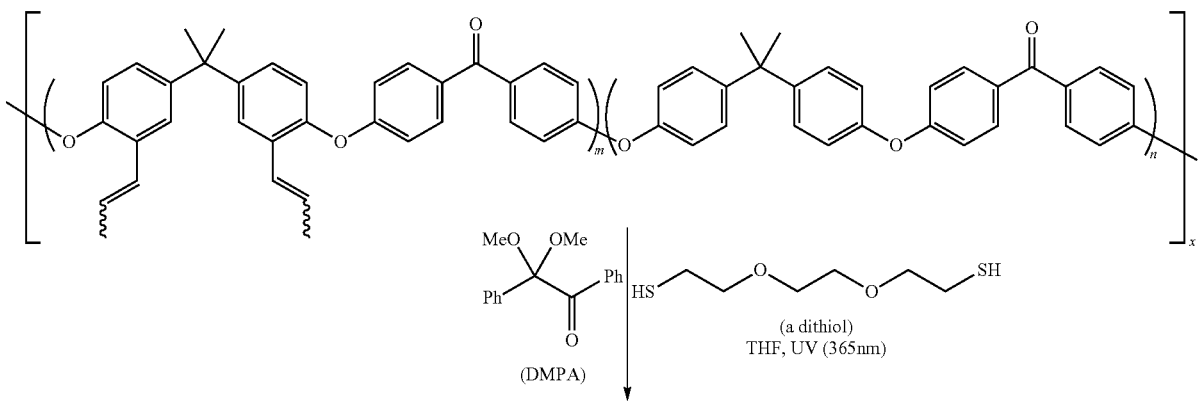

-continued

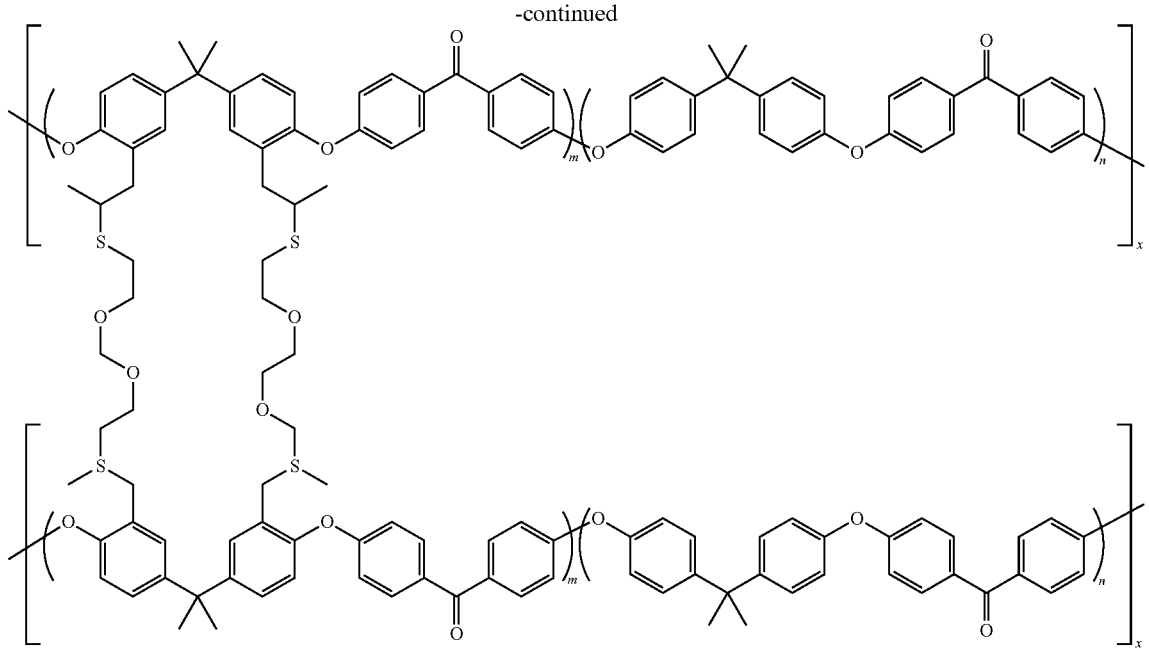

In general, thiol-ene polymerization involves two steps. In the first step, initiation occurs by radial formation upon UV excitation of a photoinitiator or the thiol itself, and the the thiyl radical is added to the carbon of an ene functionality and a subsequent hydrogen abstraction of a thiol group by a carbon-centered radical to give a thiyl radical, and secondly, a termination step occurs by radical-radical coupling. The thiol-ene reaction thus typically requires a photoinitiator, such as benzophenone (BP) or dimethoxyphenyl acetophenone (DMPA), and a thiol or a a polythiol compound, such as 3,6-dioxa-1,8-octanedithiol.

Effectively any chemical that can produce free-radicals as a result of illumination absorption can be employed as the photoinitiator species. There are in general two classes of photoinitiators. In the first class, the chemical undergoes unimolecular bond cleavage to yield free radicals. Examples of such photoinitiators include benzoin ethers, benzil ketals, a-dialkoxy-acetophenones, a-amino-alkylphenones, and acylphosphine oxides. The second class of photoinitiators is characterized by a bimolecular reaction where the photoinitiator reacts with a coinitiator to form free radicals. Examples of such are benzophenones/amines, thioxanthones/amines, and titanocenes.

The photoinitiator for polymerization used may be appropriately selected from known photo-polymerization initiators. Examples of such photoinitiators may include acetophenone-based photopolymerization initiators, benzyl ketal-based photopolymerization initiators, and phosphorus-based photopolymerization initiators. Specific examples of the acetophenone-based photopolymerization initiators may include 2-hydroxy-2-cyclohexylacetophenone, α-hydroxy-α,α'-dimethylacetophenone, 2,2-dimethoxy-2-phenylacetophenone, 4-(2-hydroxyethoxy)phenyl(2-hydroxy-2-propyl) ketone, and 2-hydroxy-1-{4-[2-hydroxy-2-methylpropionyl]-benzyl}phenyl}-2-methyl-pro-pane-1-one. Specific examples of the benzyl ketal-based photoinitiators include benzophenone, fluorenone, dibenzosuberone, 4-aminobenzophenone, 4,4'-diaminobenzophenone, 4-hydroxybenzophenone, 4-chlorobenzophenone, 2-benzyl-2-dimethylamino-1-(4-morpholinophenyl)-1-butanone-1, and 4,4'-dichlorobenzophenone. Specific examples of the phosphorus-based photopolymerization initiator include bis(2,4,6-trimethylbenzoyl)-phenylphosphine oxide, 2,4,6-trimethylbenzoyl-diphenylphosphine oxide, bis(2,4,6-trimethylbenzoyl) phenyl phenylphosphine oxide, and mixtures thereof.

The photointiator can be a phosphinate, such as benzoylphenyl phosphinate, 2,4,6-trimethylbenzoylphenyl phosphinate, ethyl benzoylpheyl phosphinate, ethyl (2,4,6-trimethylbenzoyl) phenylphosphinate, methyl benzoyl(phenyl) phosphinate, and mixtures thereof.

The photoinitiator is preferably, a radical initiator that is activated by heat or light, such as, e.g., phenylacetophenone (DMPA), azobisisobutyronitrile (AIBN), 4,4'-azobis(4-cyanovaleric acid), 1,1'-azobis(cyclohexanecarbonitrile), 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzoin, 4,4'-dimethoxybenzoin, 4,4'-dimethylbenzil, benzophenone-3,3',4,4'-tetracarboxylic dianhydride, 4-benzoylbiphenyl, 4,4'-bis(diethylamino)benzophenone, 4,4'-bis[2-(1-propenyl)phenoxy]benzophenone, 4-(diethylamino) benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, michler's ketone, bis(4-tert-butylphenyl)iodonium perfluoro-1-butanesulfonate, bis(4-tert-butylphenyl)iodonium p-toluenesulfonate, bis(4-tert-butylphenyl)iodonium triflate, boc-methoxyphenyldiphenylsulfonium triflate, (4-bromophenyl)diphenylsulfonium triflate, (tert-butoxycarbonylmethoxynaphthyl)-diphenylsulfonium triflate, (4-tert-butylphenyl)

diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, n-hydroxynaphthalimide triflate, n-hydroxy-5-norbornene-2,3-dicarboximide perfluoro-1-butanesulfonate, (4-iodophenyl)diphenylsulfonium triflate, (4-methoxyphenyl)diphenylsulfonium triflate, 2-(4-methoxystyryl)-4,6-bis(trichloromethyl)-1,3,5-triazine, (4-methylphenyl)diphenylsulfonium triflate, (4-methylthiophenyl)methyl phenyl sulfonium triflate, 1-naphthyl diphenylsulfonium triflate, (4-phenoxyphenyl)diphenylsulfonium triflate, (4-phenylthiophenyl)diphenylsulfonium triflate, triarylsulfonium hexafluoroantimonate, triarylsulfonium hexafluorophosphate, triphenylsulfonium perfluoro-1-butanesufonate, triphenylsulfonium triflate, tris(4-tert-butylphenyl)sulfonium perfluoro-1-butanesulfonate, tris(4-tert-butylphenyl)sulfonium triflate, 1-chloro-4-propoxy-9h-thioxanthen-9-one, 2-chlorothioxanthen-9-one, 2,4-diethyl-9h-thioxanthen-9-one, isopropyl-9h-thioxanthen-9-one, 10-methylphenothiazine, thioxanthen-9-one, persulfate, tert-butyl hydroperoxide, tert-butyl peracetate, cumene hydroperoxide, 2,5-di(tert-butylperoxy)-2,5-dimethyl-3-hexyne, dicumyl peroxide, 2,5-bis(tert-butylperoxy)-2,5-dimethylhexane, 2,4-pentanedione peroxide, 1-bis(tert-butylperoxy)-3,3,5-trimethylcyclohexane, 1,1-bis(tert-butylperoxy)cyclohexane, 1,1-bis(tert-amylperoxy) cyclohexane, benzoyl peroxide, 2-butanone peroxide, tert-butyl peroxide, di-tert-amyl peroxide, lauroyl peroxide, tert-butyl peroxybenzoate, tert-butylperoxy 2-ethylhexyl carbonate, tert-butyl hydroperoxide, and lithium phenyl-2,4,6-trimethylbenzoylphosphinate (LAP).

Where the polymerizable composition is used to form a thiol-ene polymer, suitable compositions will typically include a polythiol compound. Suitable thiol compounds include aliphatic (poly)thiols, aromatic (poly)thiols, and polymeric (poly)thiols.

For example, suitable examples of aliphatic and cycloaliphatic dithiols include 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol hexanedithiol, dithiodi glycol, pentanedithiol, decanedithiol, 2-methyl 1,4 butanedithiol, bis-mercaptoethylphenyl methane, 1,9-nonanedithiol(1,9-dimercaptononane), glycol dimercaptoacetate, 3-mercapto-β,4-dimethyl-cyclohexaneethanethiol, cyclohexane dimethane dithiol, and 3,7-dithia-1,9-nonanedithiol.

Suitable examples of aromatic dithiols include 1,2-benzenedithiol, 1,3-benzenedithiol, 1,4-benzenedithiol, 2,4,6-trimethyl-1,3-benzenedimethanethiol, durene-α1,α2-dithiol, 3,4-dimercaptotoluene, 4-methyl-1,2-benzenedithiol, 2,5-dimercapto-1,3,4-thiadiazole, 4,4'-thiobisbezenedithiol, bis(4-mercaptophenyl)-2,2'-propane(bisphenol dithiol), [1,1'-biphenyl]-4,4'-dithiol, and p-xylene-α,α-dithiol, while suitable examples of oligomeric dithiols include difunctional mercapto functional urethane oligomers derived from end capping moieties of hydroxyethyl mercaptan, hydroxypropyl mercaptan, dimercaptopropane, and dimercaptoethane.

Examples of suitable trithiol functional compounds include, trimethylolethane tris-mercaptopropionate, trimethylolpropane tris-mercaptopropionate, trimethylolethane tris-mercaptoacetate, and trimethylolpropane tris-mercaptoacetate glycerol tri(11-mercaptoundecate), trimethylol propane tri(11-mercaptoundecate). A trithiol can be trimethylolpropane tris(2-mercaptopropionate), and examples of suitable tetrafunctional thiols include pentaerythritol tetramercapto propionate, pentaerythritol tetramercapto acetate, and pentathritoltetra(11-mercaptoundecate).

IV. Printing

A powder of a prepolymer and a solution of an activating agent can be used in a process to create three-dimensional articles using a three-dimensional printing system. A three-dimensional printing system can have a computer, a three-dimensional printer, and means for dispensing the prepolymer powder and the activating agent. The three-dimensional printing system can optionally contain a post-printing processing system. The computer can be a personal computer, such as a desktop computer, a portable computer, or a tablet. The computer can be a stand-alone computer or a part of a Local Area Network (LAN) or a Wide Area Network (WAN). Thus, the computer can include a software application, such as a Computer Aided Design (CAD)/Computer Aided Manufacturing (CAM) program or a custom software application. The CAD/CAM program can manipulate the digital representations of three-dimensional articles stored in a data storage area. When a user desires to fabricate a three-dimensional article, the user exports the stored representation to a software program, and then instructs the program to print. The program prints each layer by sending instructions to control electronics in the printer, which operates the three-dimensional printer. Alternatively, the digital representation of the article can be directly read from a computer-readable medium (e.g., magnetic or optical disk) by printer hardware.

Typically, a first layer of the prepolymer solid or powder can be deposited onto a build plate. The deposited prepolymer solid or powder is preferably heated to a temperature that is less than about 200° C., and can be in the range of about 30° C. to 170° C., preferably in the range of about 50° C. to about 150° C. The temperature is selected such that it is below that of which polymerization of the prepolymer occurs, but aids in the polymerization of the prepolymer when the activating agent is added. Thus, the deposited prepolymer solid or powder can be heated to a build temperature of about 40° C., 50° C., 60° C., 70° C., 80° C., 100° C., 110° C., 120° C., 130° C., 140° C., 150° C., 160° C., and the like. The deposited prepolymer solid or powder can be heated to the desired temperature using any of the known contact or non-contact methods, such as for example, using a heater including, but not limited to, a microwave heater, an infrared heater, an induction heater, a micathermic heater, a solar heater, a heat exchanger, an arc heater, a dielectric heater, a gas heater, a plasma heater, a lamp heater, an infrared heater or any combination thereof, by using a heated plate or a heated roller, or by locally heating the prepolymer solid or powder using a laser or a laser diode, such as, for example, a scanning carbon dioxide laser.

The first layer of the prepolymer solid or powder can be deposited onto the build plate using any of the known methods, such as, using a roller, using a scraper, using mechanical means, and the like. Thus, for example, a measured quantity of the prepolymer solid or powder can be distributed over the build plate to a desired thickness using a roller. In another aspect, the layer of the poly(amic acid) powder can have a thickness of about 0.1 nm to less than 500 nm, of about 5 nm to about 250 nm, of about 0.2 nm to about 100 nm, of about 0.3 nm to about 50 nm, of about 0.3 nm to about 25 nm, of about 0.3 nm to about 20 nm, of about 0.3 nm to about 15 nm, of about 0.3 nm to about 10 nm, of about 0.3 nm to about 5 nm, and the like. In yet another aspect, the layer of the poly(amic acid) powder can have a thickness of about 10 microns to less than about 500 microns, of about 25 microns to about 250 microns, or of about 50 microns to about 100 microns.

Figure 2:
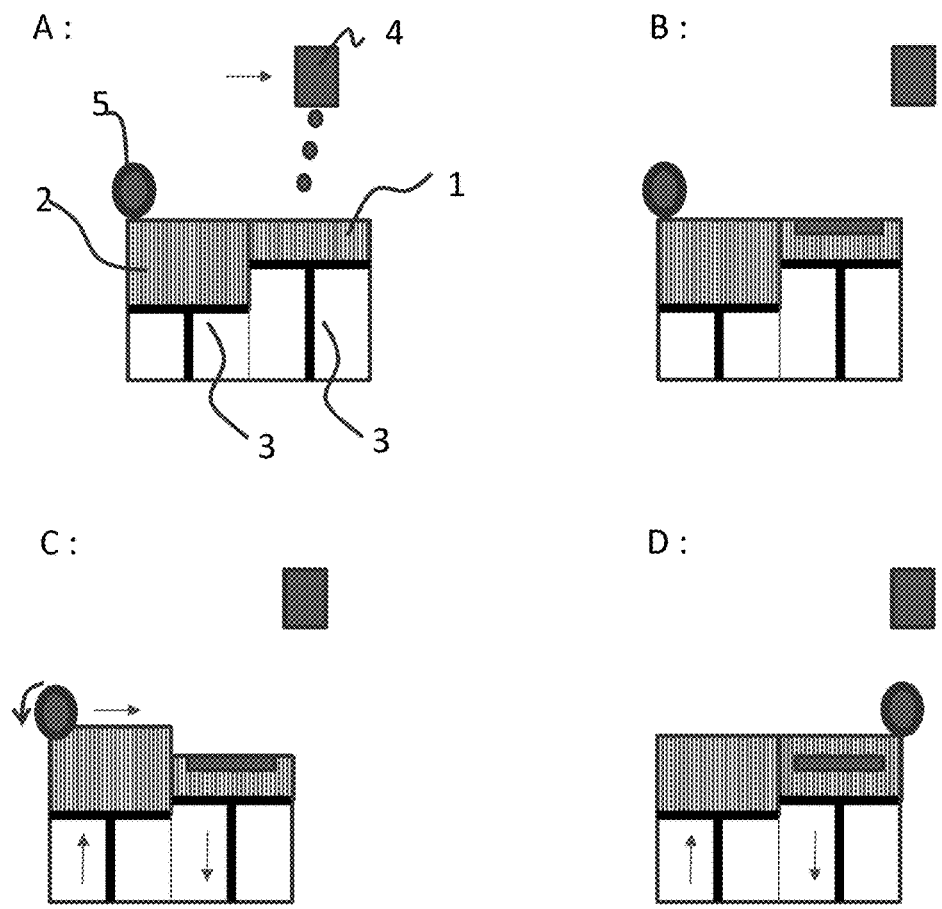
FIG. 2 illustrates a method of printing a three-dimensional article layer by layer as disclosed herein.

The method of printing a three-dimensional article layer by layer is illustrated in FIG. 2. In FIG. 2A, the roller 5, deposits prepolymer solid as a powder from one or more powder bed reservoir 2 to the powder bed 1. The build plate 3 can move in vertical direction as needed. The head 4 prints a solution of an activating agent on the powder bed 1. The solution of the activating agent can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the activator solution in a predefined pattern.

In one aspect, the three-dimensional article can be formed by using a syringe or syringe-like dispenser to print the solution of the activating agent on a build plate, as shown in FIG. 2. FIG. 2B shows a single layer being patterned. Typically, the syringe deposits a first layer of the activating agent solution onto the build plate in a two-dimensional pattern. The syringe, such as Norm-Ject Luer Lock plastic syringes, preferably has a small orifice diameter, thereby enabling the formation of electronic features having a fine minimum feature size. In one aspect, the syringe or other deposition tool includes a deposition orifice having a diameter of not greater than about 200 μm, more preferably not greater than 100 μm, more preferably not greater than 50 μm and even more preferably not greater than about 25 μm. The print speed is dependent on feature size and materials used, and can be easily determined by one of skill in the art and adjusted as desired, and can be between about 1 mm/sec to about 1000 mm/sec, about 5 mm/sec to about 500 mm/sec, about 20 mm/sec to about 100 mm/sec, or about 10 mm/sec to about 50 mm/sec. Thus, the print speed can be between about 5 mm/sec to about 30 mm/sec, or between about 10 mm/sec to about 20 mm/sec.

The printing system can have a printing mechanism for printing a solution of the activating agent onto the prepolymer solid or powder. For example, printing may comprise inkjet printing, single jet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the prepolymer solution in a predefined pattern, Thus, the three-dimensional article can be formed by using an ink jet type print cartridge to deposit the solution of the activating agent from the ink jets onto a built plate. Ink jet print heads that can be used in the disclosed methods include MH5420, MH2480, MH2420, and MH1801, all available from Ricoh Printing Systems America, Inc.

Typically, an ink-jet nozzle prints a two-dimensional pattern of a solution of an activating agent or a photoinitiator onto the prepolymer powder bed deposited on a built plate. The printed solution can be contacted with a stimulus wherein the prepolymer is converted, at least partially, to the final polymer. As described in detail below, the selected stimulus is dependent on the prepolymer, and can be heat, chemical oxidants, acids, light, electrolysis, metal catalysts, and the like. After a preset period of time that is selected to allow the prepolymer to partially or fully convert to the final polymer, the next layer of the prepolymer powder can be deposited to form a powder bed, and the steps repeated. Thus, a 3D article can be manufactured layer by layer.

Optionally, the printed solution can be exposed to a stimulus to form a polymer layer of the three-dimensional article. For example, when the prepolymer is poly(amic acid), the stimulus can be heat or a chemical imidization reactant. When the prepolymer is a ketal, the stimulus can be a Brønsted acid, a Lewis acid, or light. When the prepolymer is a polysulfide, the stimulus can be an oxidant, such as an organic peroxy acids, an organic peroxides, an inorganic peroxides, or mixtures thereof. When the prepolymer contain a cross-linking moiety, the stimulus can be light, such as visible light or UV light.

In FIG. 2C, the roller 5, as depositing mechanism, deposits prepolymer powder from a powder bed reservoir 2 to the powder bed 1. FIG. 2D shows that the prepolymer powder has formed a new powder bed layer, and the process can be repeated to print a three-dimensional article layer by layer.

In another aspect, the three-dimensional article can be formed by patterning successive layers on a build plate using lithography. The three-dimensional article can be formed by applying a layer of prepolymer powder to form a powder bed on a build plate. Heating the powder bed to a predetermined temperature. Printing a solution of an activating agent on the powder bed through a patterned imaging plate, such as a mask or reticle. The activating agent solution can be deposited using any known methods, such as, for example, spraying, by using a syringe, by using an inkjet print head, and the like.

The region that received the jetted activating agent solution is allowed to polymerize by maintaining the temperature for the duration of the hold time. Thus, the prepolymer powder exposed to the activating agent solution can be allowed to stay at the hold temperature or the present temperature for about 1 minute to about 2 hours, preferably about 5 minutes to about 30 minutes, more preferably about 8 minutes to about 15 minutes, or from about 1 sec to about 300 sec, preferably about 5 sec to about 30 sec, more preferably about 8 sec to about 15 sec. Thus, the prepolymer powder exposed to the activating agent solution can be allowed to stay on the plate at the hold temperature or the present temperature for hold time of about 7 minutes, about 8 minutes, about 9 minutes, about 10 minutes, about 11 minutes, about 12 minutes, about 13 minutes, about 14 minutes, about 15 minutes, and the like. Without being bound to a theory, the activating agent and the holding period allows volatile components of the fluid, such as the solvent, to evaporate, and the layer to polymerize or at least partially polymerize to form the final polymer. Thus, the holding time is selected such that the prepolymer can polymerize to the final polymer in the presence of the activating agent. The activating agent allows lower hold temperature to be used during the printing of the 3D article.

The process is repeated with a new layer of the prepolymer powder being applied over the top of the previous layer on the build plate. The next cross section of the desired product is then printed with the activating agent solution being printed onto the new powder layer.

The previous steps of applying a layer of the prepolymer powder to the build plate, depositing a solution of activator and allowing it to stay on the build plate at a predetermined temperature and for a predetermined period of hold time are repeated until the final article is completed. The unreacted poly(amic acid) powder can be removed, if desired, at any time during the process. Thus, a three-dimensional article can be built layer by layer by depositing a series of prepolymer layers on a build plate to form a powder bed, and printing a solution of the activating agent onto the powder bed.

V. Curing

The three-dimensional article obtained using the methods and processes described above can be cured to obtain the final three-dimensional article. The curing of the article can be done while it is attached to the build plate, or the curing of the article can be done by separating it from the build plate first and then curing it. In the curing process, the unreacted prepolymer is converted to the final polymer. Thus, for example, if the prepolymer is poly(amic acid), the unreacted poly(amic acid) is converted to the polyimide polymer via imidization during the curing process.

In one aspect, during the curing process, the poly(amic acid) can be converted to a polyimide polymer by dehydration wherein water is eliminated. Imidization to produce the polyimide, i.e. ring closure in the poly(amic acid), can be effected through thermal treatment, chemical dehydration or both, followed by the elimination of a condensate. The polyimide polymer can be produced by a polymerization/imidization reaction according to a known method such as a thermal imidization by heat treatment accompanied by solvent removal and a chemical imidization, for example, by treatment with acetic anhydride accompanied by solvent removal.

In one aspect, chemical imidization can be used to convert the poly(amic acid) to the polyimide. Chemical imidization can be carried out using known agents, such as acetic anhydride; orthoesters, such as, triethyl orthoformate; coupling reagents, such as, carbodiimides, such as dicyclohexylcarbodiimide (DCC) and diisopropylcarbodiimide (DIC), boronic acid, boronic esters, and the like.

In yet another aspect, the curing of compounds such as polyimide and compositions or articles comprising polyimides can be accomplished by curing at elevated temperatures. The curing can be by isothermal heating at a temperature greater than about 190° C., preferably greater than about 250° C., more preferably greater than about 290° C. Thus, the thermal imidization can be carried out at about 280° C., about 290° C., about 300° C., about 310° C., about 320° C., about 350° C., about 375° C., and the like. The curing temperature is selected such that poly(amic acid) is converted to a polyimide and the temperature is below the glass transition temperature or the melting point of the polyimide.

Alternatively, the curing at elevated temperatures can be performed in an isothermal staging process. As an example, such an isothermal staging process can start by heating the material to be cured to 180° C. to 220° C., such as to about 200° C., for some time, typically 1 to 2 hours. However, also less time, such as less than 1 hour, or less than 30 minutes, can be used. Further, also longer times, such as up to 10 hours may be used. Subsequently, the temperature can be increased in steps. Each step may correspond to an increase of the temperature of 10° C. to 50° C. Further, each step may have duration of 30 minutes to 10 hours, such as 1 to 2 hours. The last step may be curing at a temperature of 250 to 400° C., such as at about 300° C. In an isothermal staging process the duration of each isothermal step may decrease as the temperature increases. A further example of an isothermal staging process, is a process starting at 150° C. in which the temperature is increased by 25° C. every hour until 300° C. is reached.

Curing the final product at elevated temperatures can be performed with continuously increasing temperature. Preferably, the heating rate is slow initially but gradually increased as the temperature increases. Thus, for example, the heating process can start at 150° C. and the temperature is increased continuously until 300° C. or above is reached.

The time of heating for thermal imidization can be about 0.1 h to about 48 h, such as 0.5 h to 15 hours, or 0.5 h to 5 h.

The polyimide polymer thus produced has a tensile strength at break of 150 MPa or higher, more preferably 200 MPa or higher, particularly preferably 250 MPa or higher. The tensile strength can be measured using known methods, such by using the Instron Load Frame instruments.

The polyimide polymer thus produced has a tensile modulus of 1.5 GPa or higher, more preferably 2.0 GPa or higher, particularly preferably 2.5 GPa or higher.

The three-dimensional articles prepared using the methods, processes, and systems of the invention are useful in circuit applications, medical applications, transportation applications, and the like. For example the three-dimensional articles can be a printed circuit, an insulator, a medical construct such as an orthotic device, a dental implant, prosthetic sockets, and the like, seal rings, washers, and the like.

EXAMPLES

The examples below are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Synthesis of Polymers Comprising an Alkene Moiety:
Poly(amic acid) having the following structure:

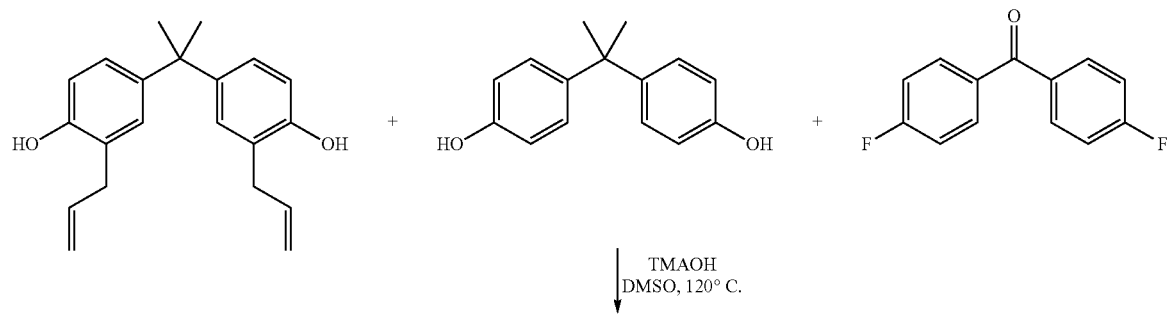

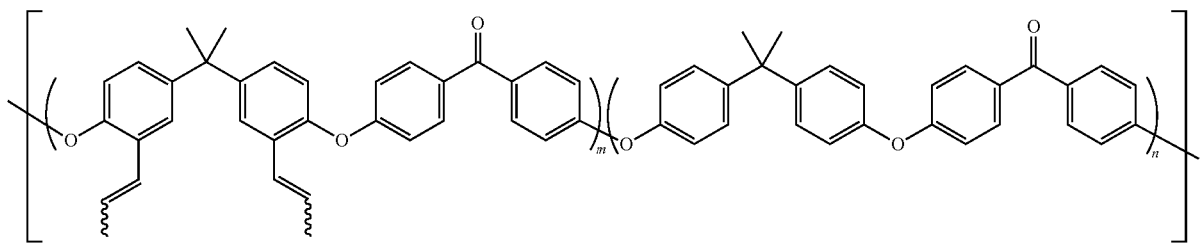

was synthesized. To a 100 mL flask was added 4,4'-difluorobenzophenone (3.30 g, 15.12 mmol), bisphenol A (1.72 g, 7.53 mmol), 2,2'-diallyl bisphenol A (2.33 g, 7.55 mmol) and DMSO (30 mL). The suspension was heated to 50° C. until all solids dissolved. To this solution was added tetramethylammonium hydroxide pentahydrate (5.54 g, 30.57 mmol) and the reaction temperature increased to 120° C. After 90 minutes, the reaction was cooled to room temperature and the liquid decanted. The remaining solids were dissolved in dichloromethane and precipitated into methanol to give the alkene-containing PEEK (4.69 g, 70% yield). Analysis by $^1$H-NMR showed a ~1:1 ratio of BPA:diallyl BPA units.

Example 2

Synthesis of Polymers Comprising an Epoxide Moiety:

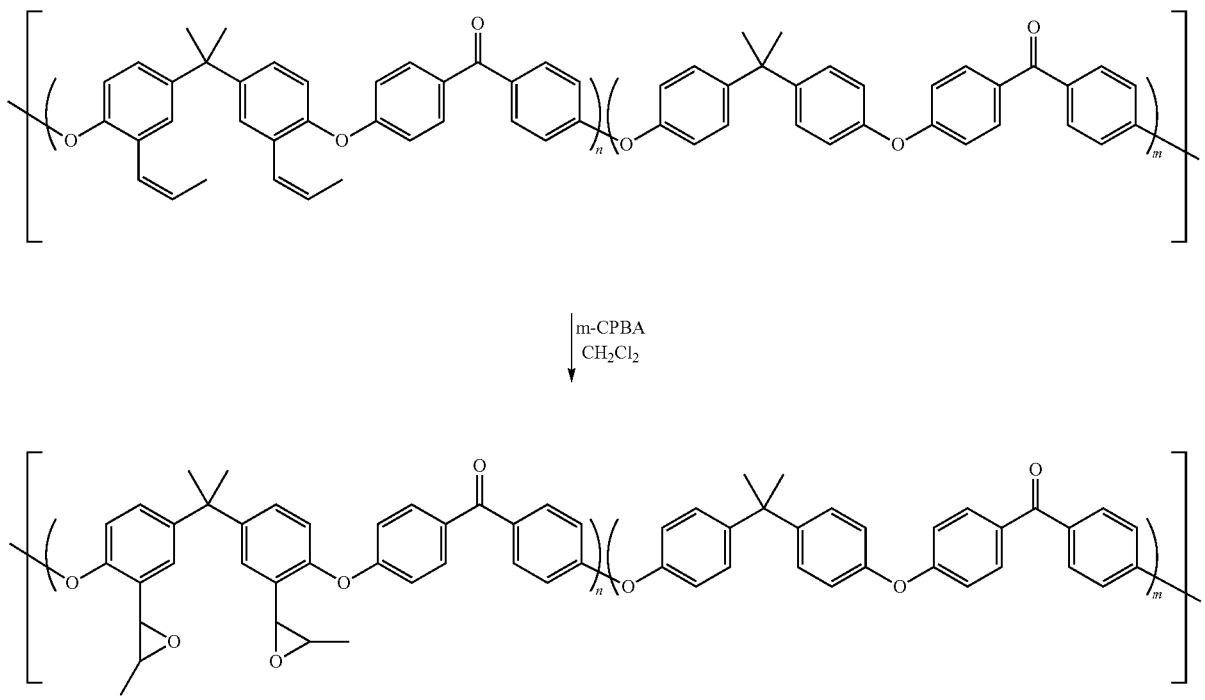

To a solution of the alkene-containing PEEK prepared in Example 1 (4.69 g, 10.51 mmol) in dichloromethane (75 mL) was added m-CPBA (5.21 g, 21.13 mmol). After stirring for 2 hours, the polymer was precipitated into methanol to give the epoxy-PEEK polymer (4.23 g, 87% yield). GPC analysis showed $M_n$=21.6 KDa; $M_w$=39.4 KDa; $Đ$=1.82.

Example 3

Preparation of a Three Dimensional (3D) Article Using Epoxy PEEK Polymer:

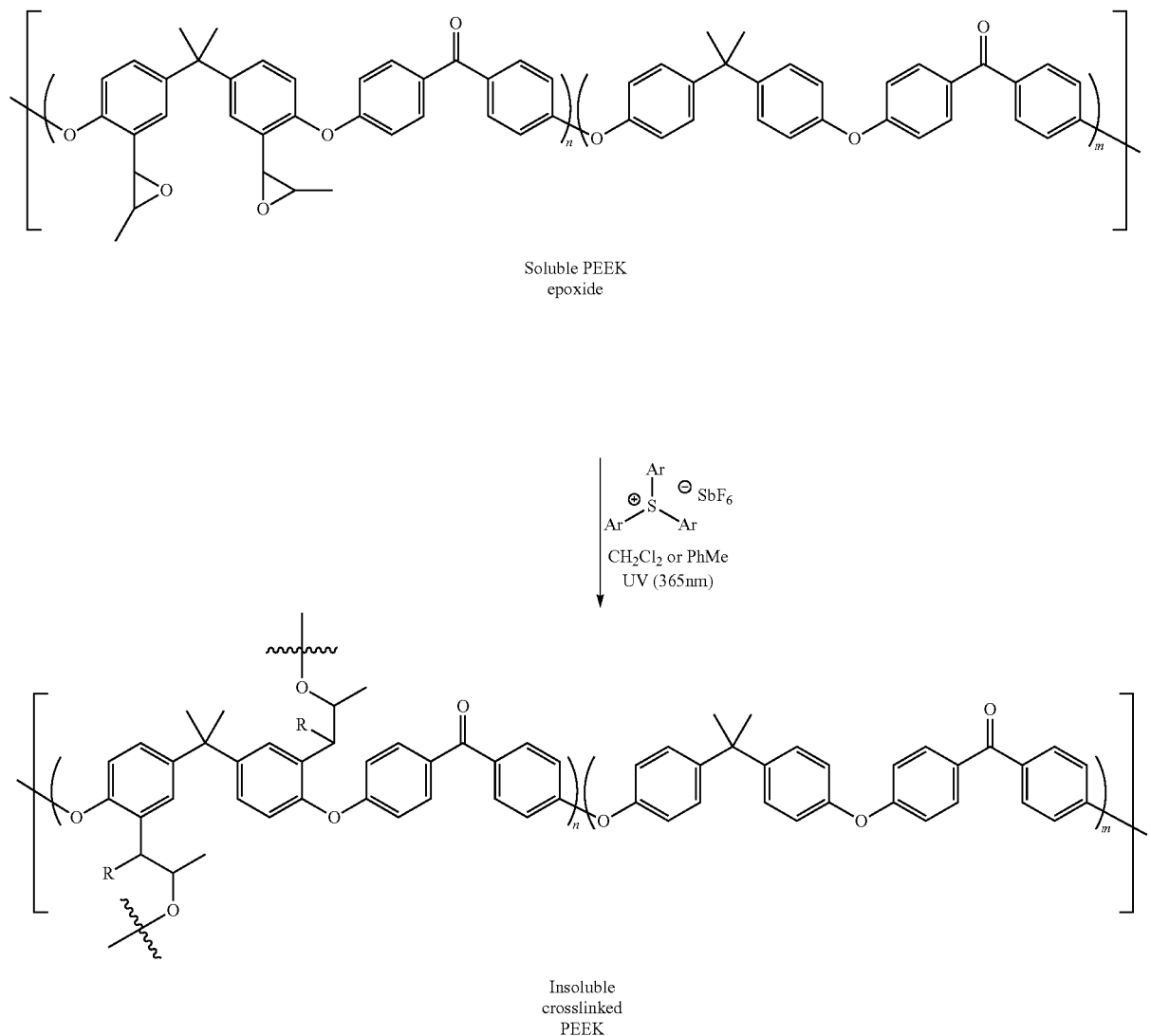

The printing solution was prepared by dissolving the epoxy-PEEK polymer in toluene to make a 250 mg/mL solution. To this solution was added the mixture of triarylsulfonium hexafluoroantimonate salts (50% in propylene carbonate, Sigma-Aldrich product #654027) at a loading of 5 wt. % relative to the amount of epoxy-PEEK.

This solution was deposited onto a glass slide using a syringe. After each layer was deposited, the slide was irradiated with UV light (365 nm, 2W) for 60 seconds to promote crosslinking before depositing the subsequent layer. After the final layer had been cured under UV light, the article was removed from the glass slide and the remaining solvent allowed to evaporate to give the final 3D article. Using the method, a rectangular feature comprising 10 layers was successfully prepared. DMA analysis (single cantilever) of this feature showed that the material had an initial modulus of 520 MPa and a $T_g$ of 86° C.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for manufacturing a three-dimensional article, the method comprising:
    a. depositing a powder of prepolymer on a build plate to form a powder bed wherein the prepolymer comprises polyketone having one or more alkene groups or one or more epoxide groups;
    b. printing a solvent at selected locations on the powder bed;
    c. exposing the printed solution to a stimulus to form a polymer layer of the three-dimensional article; and
    d. repeating steps (a)-(c) to manufacture remainder of the three-dimensional article.

2. The method of claim 1, wherein step b further comprises heating the powder bed to about 50° C. to about 170° C.

3. The method of claim 1, wherein step b optionally comprises a photoinitiator.

4. The method of claim 3, wherein the photoinitiator is phenylacetophenone (DMPA), azobisisobutyronitrile (AIBN), fluorenone, a phosphine oxide, or combinations thereof.

5. The method of claim 1, wherein the steps are repeated after about 5 minutes to about 15 minutes.

6. The method of claim 1, further comprising the step of curing.

7. The method of claim 5, wherein curing is done by chemical curing or thermal curing.

8. The method of claim 6, wherein the thermal curing is carried out at about 300° C. to or above.

* * * * *